United States Patent [19]
Reiter

[11] 3,798,777
[45] Mar. 26, 1974

[54] DENTAL HANDPIECE
[76] Inventor: Gabriel Reiter, 8204 Ventnor Ave., Margate, N.J. 08402
[22] Filed: Nov. 3, 1971
[21] Appl. No.: 195,269

[52] U.S. Cl. .................................................. 32/27
[51] Int. Cl. ............................................. A61c 1/10
[58] Field of Search .................................. 32/26, 27

[56] References Cited
UNITED STATES PATENTS
1,838,982  12/1931  Angell .................................... 32/27
1,112,565  10/1914  Schultz ................................... 32/27
3,421,224  1/1969   Brehm et al. ........................... 32/27

Primary Examiner—Louis G. Mancene
Assistant Examiner—I. O. Lever

[57] ABSTRACT

A dental handpiece including a pair of complementary housing sections defining an angulate through passageway, a pair of shafts in angulate relation within the passageway, and gearing on the proximate shaft ends for transmitting rotary motion therebetween.

4 Claims, 3 Drawing Figures

PATENTED MAR 26 1974 3,798,777
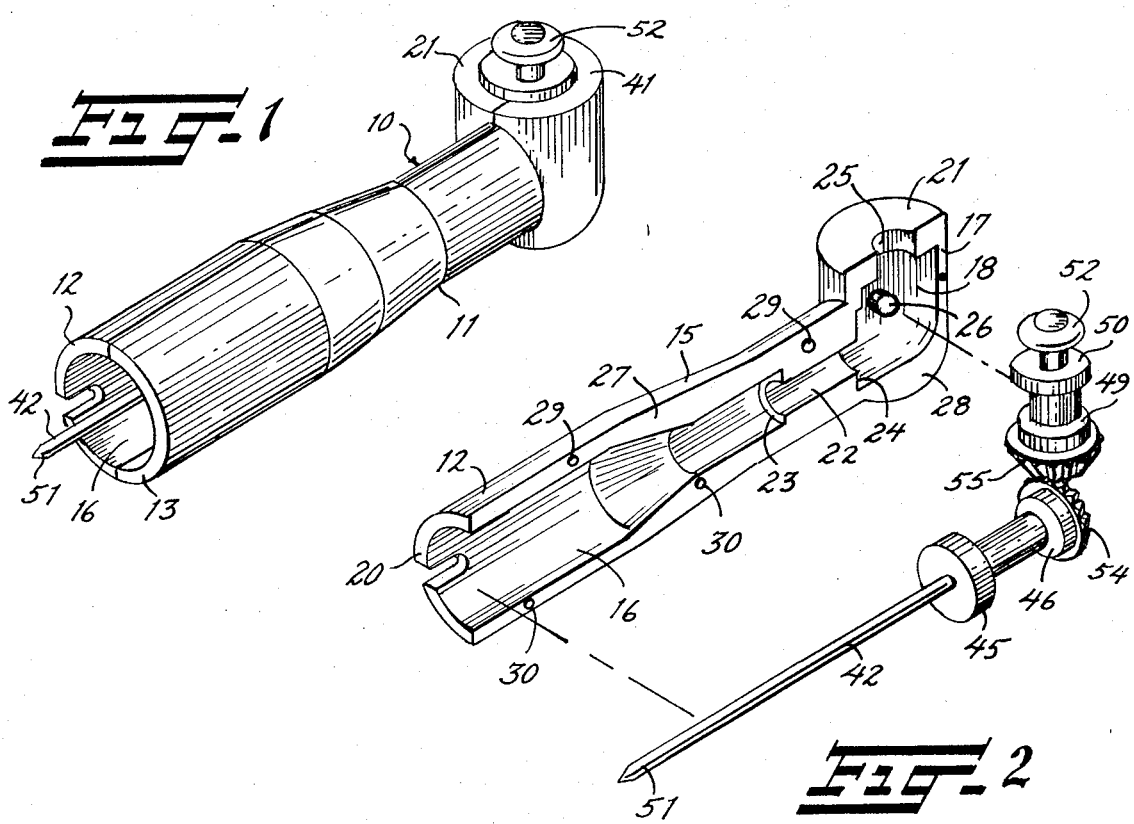
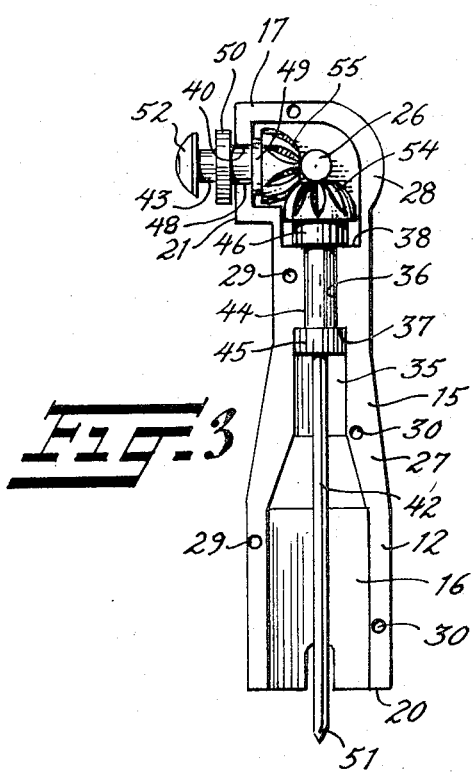
GABRIEL REITER INVENTOR
BY Robert K. Youtie
ATTORNEY

DENTAL HANDPIECE

BACKGROUND OF THE INVENTION

As is well known to those versed in the art, dental handpieces, such as contra angles, right angles and other types of handpieces are subject to rapid wear inherent in the environment of usage and extremely high speeds, so that frequent cleaning, lubricating, repair and replacement of parts is necessary. This is not only expensive, both for the handpieces and repair parts and supplies, but extremely time-consuming for the dental practitioner and his staff.

SUMMARY OF THE INVENTION

Accordingly, it is an important object of the present invention to provide a handpiece for dental use, the improved features of which are equally applicable to a wide variety of dental handpieces, which is highly reliable in operation, runs relatively cool in continuous service with substantial freedom from vibration at extremely high speeds, and which is capable of extremely economic manufacture to justify discard of the handpiece in place of periodic cleaning, lubrication and repair.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view illustrating a dental handpiece constructed in accordance with the teachings of the present invention.

FIG. 2 is an exploded perspective view illustrating certain component parts of the instant handpiece.

FIG. 3 is a longitudinal view showing a handpiece of the present invention in assembled condition, but with parts removed to illustrate the interior construction.

DESCRIPTION OF THE PREFERRED EMBODIMENT

Referring now more particularly to the drawings, and specifically to FIG. 1 thereof, a dental handpiece is there generally designated 10, and includes an angulate housing 11, as for use in conjunction with engines of various types. While a right angle handpiece is shown in the illustrated embodiment, it is appreciated that a contra angle or other desired handpiece may advantageously incorporate the unique features of the instant invention.

The angulate housing 11 is composed of a pair of complementary sections 12 and 13, which may be essentially identical to each other, but of opposite hand. Thus, a detailed description of both housing sections 12 and 13 is not believed necessary to an understanding of the instant invention, the housing section 12 being shown in FIGS. 2 and 3 and described hereinafter in greater detail.

In particular, the housing section 12 includes an elongate, major portion 15 having a longitudinally extending recess 16, and an additional portion 17 extending from one end of the portion 15 at an angle thereto and having a hollow or recess 18 communicating with and extending in angulate relation with respect to the hollow or recess 16 of the housing section portion 15. The hollow or recess 16 opens through the end 20 of portion 15 remote from portion 17, while the hollow or recess 18 opens through the end 21 of portion 17 remote from the portion 15. Thus, the communicating recesses 16 and 18 combine to define a continuous hollow or recess in and opening through opposite ends of the housing section 12.

The elongate hollow or recess 16 of the housing section portion 15 is provided with a reduced portion 22 having a generally semicylindrical configuration and terminating at opposite ends in oppositely facing semicircular surfaces or walls 23 and 24. From the reduced portion 22 of hollow or recess 16, the hollow is generally of increased internal dimensions toward the section end 20. In the other direction, the reduced portion 20 opens into the relatively large cross-section of hollow or recess 18.

The hollow or recess 18 of portion 17 may be considered as terminating remote from the section portion 15 in the end wall 21. The end wall 21 is formed with a generally semicylindrical cutout or notch 25 which may be considered as a reduced portion of the hollow or recess 18.

Interiorly of the angulately disposed communicating recesses or hollows 16 and 18, substantially at the juncture or apex thereof, there is provided a lug, projection or abutment 26, in the form of a pin or stub shaft extending generally normal to the plane of intersecting hollows or recesses 16 and 18 and terminating at a free end substantially flush with the coplanar surfaces of housing section 12 bounding the hollows or recesses, such surfaces being designated 27 and 28.

Provided on the surfaces 27 and 28 may be a plurality of formations 29 and 30, respectively. As illustrated, the formations 29 and 30 may be circular recesses, cavities or holes.

The complementary housing section 13 may be essentially identical to the housing section 12, except that formations are provided for interfitting engagement with the recesses or holes 29 and 30, such as suitable projections or pins. Thus, it will be appreciated that the pair of complementary housing sections 12 and 13, in their assembled relation, combine to define an angulate through passageway 35 opening through opposite ends of the housing. The reduced hollow portion 22 of section 12, and its complementary, facing reduced hollow portion of section 13 combine to define a generally cylindrical, open ended reduced passageway portion 36 terminating in oppositely outwardly facing circular end surfaces 37 and 38. Similarly, the reduced portion 25 and its complementary facing reduced portion of section 13 combine to define a generally cylindrical reduced portion 40 terminating at its opposite ends in oppositely facing surfaces of end wall 21 and complementary end wall 41 of housing section 13.

Disposed interiorly of the through passageway 35 are a pair of shafts 42 and 43 arranged in angulate relation with respect to each other each in a respective angulately disposed portion of the passageway 35. More specifically, the shaft 42 is relatively long and disposed in the relatively long region of passageway 35, being formed with a coaxial generally cylindrical journal 44 rotatably received in the reduced passageway portion 36, the latter serving to provide a bearing for the journal. By this means, the shaft 42 is axially rotatable, and a pair of spaced enlargements or shoulders 45 and 46 are provided on the shaft 42 on opposite sides of the shaft journal 44 for respective limiting engagement with surfaces 37 and 38. The shoulders 45 and 46 thus limit the shaft against excessive longitudinal shifting while permitting of free shaft rotation.

The shaft 43 is similarly provided with an axial cylindrical journal 48 rotatably supported in the reduced portion 40, and a pair of spaced enlargements or shoulders 49 and 50 are provided on the shaft 43 for respective limiting engagement with the inner and outer sides of housing end wall 21, 41. The shaft 43 is thereby axially journaled and effectively restrained against excessive longitudinal shifting.

The distal or outer end of shaft 44, as at 51 may be provided for suitable driven connection with the various drivers or engines conventionally employed, and further the outer or distal end of shaft 43 may be provided with a head 52 for removable snap-on engagement of prophy cups, or other tools.

On the inner, proximate ends of shafts 42 and 43, adjacent to the apex of the angulate shaft relationship, the shafts are respectively provided with bevel gears 54 and 55 in meshing relation with each other. The bevel gears 54 and 55 have their smaller ends abuttingly engageable with the abutment pin or lug 26, and the complementary abutment lug of housing section 13, to effectively rigidify the overhanging gears in their driving relationship and further resist relative longitudinal shaft movement.

As will appear from a careful observation of the drawings, the bevel gears 54 and 55 are each configured so that its teeth are of a convex arcuate configuration extending longitudinally along the crest of each tooth. While the shafts 42 and 43, and their respective bevel gears 54 and 55 are shown as being generally at right angles to each other, it is appreciated that the annular relationship may be different, as desired. However, the arcuately convex tooth crest configuration serves to permit of substantial variation in angularity of the shafts 42 and 43 without adversely affecting the driving interengagement between the gears 54 and 55. In addition, the arcuately convex configuration of each tooth crest extending longitudinally therealong permits of relatively simple manufacture by molding of plastic material.

Indeed, it is intended that the several parts of the instant handpiece, as described hereinbefore, may be economically mass-produced by plastic molding techniques, permitting of easy assembly by merely dropping the shafts 42 and 43 into one of the housing sections and closing the latter with the other housing section. Adhesive or other suitable securing means may hold the housing sections in their complementary facing relation of FIG. 1 for usage in the conventional manner. Upon the need for maintenance, such as cleaning, lubrication, repair or replacement of parts, the economies effected permit of discarding the assembly and using a new assembly of the present invention.

From the foregoing it will now be appreciated that the present invention provides a dental handpiece which is extremely simple in construction, economic in manufacture and use, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A dental handpiece comprising a pair of angulate housing sections arranged in complementary facing relation and combining to define a housing having an angulate through passageway, a pair of shafts extending in angulate relation with respect to each other and into respective ends of said housing terminating proximate to the apex of said angulate relation, reduced portions in said housing sections in respective facing relation with each other and rotatably receiving said shafts to define shaft journal bearings, bevel gears on the proximate shaft ends in meshing engagement with each other for transmitting rotary motion between shafts, and limit means fixed in said housing sections limiting longitudinal shaft movement to assure proper motion transmission, said limit means comprising an abutment fixed at the apex of said angular passageway in limiting engagement with both said gears.

2. A dental handpiece according to claim 5, said limit means further comprising shoulders on said shafts engageable with said reduced portions.

3. A dental handpiece comprising a pair of angulate housing sections arranged in complementary facing relation and combining to define a housing having an angulate through passageway, a pair of shafts extending in angulate relation with respect to each other and into respective ends of said housing terminating proximate to the apex of said angulate relation, reduced portions in said housing sections in respective facing relation with each other and rotatably receiving said shafts to define shaft journal bearings, bevel gears on the proximate shaft ends in meshing engagement with each other for transmitting rotary motion between shafts, and limit means fixed in said housing sections limiting longitudinal shaft movement to assure proper motion transmission, said bevel gears each having its teeth of convex arcuate configuration extending longitudinally along the tooth crest, to facilitate molding and permit of angulate variation without motion transmission malfunction.

4. A dental handpiece according to claim 7, said housing sections, shafts and gears all being molded of plastic material.

* * * * *